(12) United States Patent
Dietschi et al.

(10) Patent No.: US 9,709,432 B2
(45) Date of Patent: Jul. 18, 2017

(54) MILK LEVEL MEASUREMENT DEVICE AND RELATED MEASUREMENT METHOD

(71) Applicant: RANCILIO GROUP S.P.A., Villastanza di Parabiago (mi) (IT)

(72) Inventors: Fabian Dietschi, Dottikon (CH); Alain Erismann, Dottikon (CH); Carlo Carbonini, Villastanza di Parabiago (IT)

(73) Assignee: RANCILIO GROUP S.P.A., Villastanza di Parabiago (IT)

( * ) Notice: Subject to any disclaimer, the term of this patent is extended or adjusted under 35 U.S.C. 154(b) by 86 days.

(21) Appl. No.: 14/396,552

(22) PCT Filed: May 3, 2013

(86) PCT No.: PCT/IB2013/053531
§ 371 (c)(1),
(2) Date: Oct. 23, 2014

(87) PCT Pub. No.: WO2013/168065
PCT Pub. Date: Nov. 14, 2013

(65) Prior Publication Data
US 2015/0114105 A1    Apr. 30, 2015

(30) Foreign Application Priority Data
May 9, 2012 (IT) .............................. TO2012A0418

(51) Int. Cl.
*G01F 23/14* (2006.01)
*A47J 31/44* (2006.01)
*G01F 23/16* (2006.01)

(52) U.S. Cl.
CPC .......... *G01F 23/14* (2013.01); *A47J 31/4457* (2013.01); *A47J 31/4485* (2013.01); *G01F 23/162* (2013.01)

(58) Field of Classification Search
CPC .... G01F 23/14; G01F 23/162; A47J 31/4485; A47J 31/4457
(Continued)

(56) References Cited

U.S. PATENT DOCUMENTS

| 1,923,224 A | 8/1933 | Moise et al. |
| 5,095,739 A * | 3/1992 | Hedtke .................. G01F 23/14 |
| | | 73/302 |

(Continued)

FOREIGN PATENT DOCUMENTS

| EP | 2 409 612 A1 | 1/2012 | |
| IT | EP 2409612 A1 * | 1/2012 | .......... A47J 31/4457 |

OTHER PUBLICATIONS

International Search Report of PCT/IB2013/053531 dated Sep. 5, 2013 [PCT/ISA/210].
(Continued)

*Primary Examiner* — Natalie Huls
*Assistant Examiner* — Monica S Young
(74) *Attorney, Agent, or Firm* — Sughrue Mion, PLLC

(57) ABSTRACT

A device arranged for measuring a level of a liquid in a container. The device has a sensor, arranged to sense a pressure of a liquid in a tube, a pump arranged to pump the liquid from the container through the tube, and a valve located along the tube between the sensor and the pump and arranged to impede back flow of the liquid into the container when the pump stops pumping the liquid. The device is arranged to measure the level of the liquid into the container on the basis of the hydrostatic pressure measured by the sensor after each stop of the pump. Also disclosed is a method for measuring a level of a liquid in a container by a pressure sensor.

16 Claims, 2 Drawing Sheets

(58) Field of Classification Search
USPC .......................................................... 73/426
See application file for complete search history.

(56) References Cited

U.S. PATENT DOCUMENTS

| | | | | | |
|---|---|---|---|---|---|
| 5,839,483 | A * | 11/1998 | Rejret | .................. | B67D 1/1466 141/1 |
| 7,004,023 | B2 * | 2/2006 | Merrild | .................. | G01F 23/14 73/303 |
| 2003/0172745 | A1 * | 9/2003 | Mitchinson | ............... | G01F 1/34 73/861.49 |
| 2003/0232115 | A1 * | 12/2003 | Eckenhausen | ...... | A47J 31/4485 426/477 |
| 2005/0120792 | A1 * | 6/2005 | Merrild | .................. | G01F 23/14 73/303 |
| 2006/0108023 | A1 * | 5/2006 | Greiwe | ............... | A47J 31/4482 141/369 |
| 2009/0031901 | A1 * | 2/2009 | Peden | .................. | A47J 31/4485 99/280 |
| 2009/0205502 | A1 * | 8/2009 | Carbonini | ............... | A47J 31/52 99/280 |
| 2010/0024658 | A1 * | 2/2010 | Jacobs | .................... | A47J 31/46 99/302 R |
| 2010/0047406 | A1 * | 2/2010 | Reyhanloo | .......... | A47J 31/4485 426/231 |
| 2010/0242497 | A1 * | 9/2010 | Bertone | ................. | A23G 9/045 62/1 |
| 2013/0115343 | A1 * | 5/2013 | Reyhanloo | .......... | A47J 31/4485 426/231 |
| 2015/0104548 | A1 * | 4/2015 | Yip | .................... | A47J 31/4489 426/231 |

OTHER PUBLICATIONS

Written Opinion of PCT/IB2013/053531 dated Sep. 5, 2013 [PCT/ISA/237].

* cited by examiner

MILK LEVEL MEASUREMENT DEVICE AND RELATED MEASUREMENT METHOD

CROSS REFERENCE TO RELATED APPLICATIONS

This application is a National Stage of International Application No. PCT/IB2013/053531, filed May 3, 2013, claiming priority based on Italian Patent Application No. TO2012A000418, filed May 9, 2012, the contents of all of which are incorporated herein by reference in their entirety.

TECHNICAL FIELD

The present invention relates, in general, to a milk level measurement device.
In particular, present invention relates to a milk level measurement device for a coffee machine, for example a super-automatic coffee machine.

BACKGROUND ART

Measurement devices that use hydrostatic pressure for determining a level of a liquid in a tank are known in the art.
For instance, from document U.S. Pat. No. 7,004,023 B2 a method and system for level measurement of a liquid in containers is known.
The known method and system provides the level of a liquid in containers by determining different pressure values in a suction pipe during at least one cycle of suction and non-suction of a liquid from a container by means of a pump.
The main problem of the known method and corresponding system resides in that the pressure values determined, in particular during the suction, can be not stable so as to cause errors on the level measurement.
A further problem of the known method and corresponding system resides in that the measurement of the level is of incremental type, being based on determining the liquid consumed by means of the pump when activated.
Applicant, in general, has noted that known prior art do not effectively solve the problem of using in an optimised way the hydrostatic pressure for determining a level of a liquid in a tank.

DISCLOSURE OF THE INVENTION

The object of the present invention is thus to solve the problems outlined above.
Such an object is achieved by a device for measuring a level of a liquid in a container having the features set forth in the claims that follow.
The present invention also relates to a method for measuring a level of a liquid in a container.
Claims are an integral part of the teaching of the present invention.
The following summary of the invention is provided in order to give a basic understanding of some aspects and features of the invention. This summary is not an extensive overview of the invention, and as such it is not intended to particularly identify key or critical elements of the invention, or to delineate the scope of the invention. Its sole purpose is to present some concepts of the invention in a simplified form as a prelude to the more detailed description that is presented below.
According to a feature of a preferred embodiment of present invention the device comprises a valve, interposed between a suction pump and a pressure sensor, and arranged to impede back flow of the liquid into the container so that the sensor is apt to measure the hydrostatic pressure in the tube and the device is apt to measure the level of the liquid into the container after each stop of the suction pump.
According to a further feature of present invention the pump and the valve are controlled by a control unit arranged to activate/deactivate the pump and open/close the valve, respectively.
According to another feature of present invention the control unit comprises stored therein a table including size and capacity of a plurality of containers and is arranged to calculate the quantity of liquid remaining into the container on the basis of the measured level of the liquid and of the size and capacity of the container.

BRIEF DESCRIPTION OF DRAWINGS

These and further features and advantages of the present invention will appear more clearly from the following detailed description of a preferred embodiment, provided by way of a non-limiting example with reference to the attached drawings, in which components designated by same or similar reference numerals indicate components having same or similar functionality and construction and wherein.

BEST MODE FOR CARRYING OUT THE INVENTION

Figure 1:
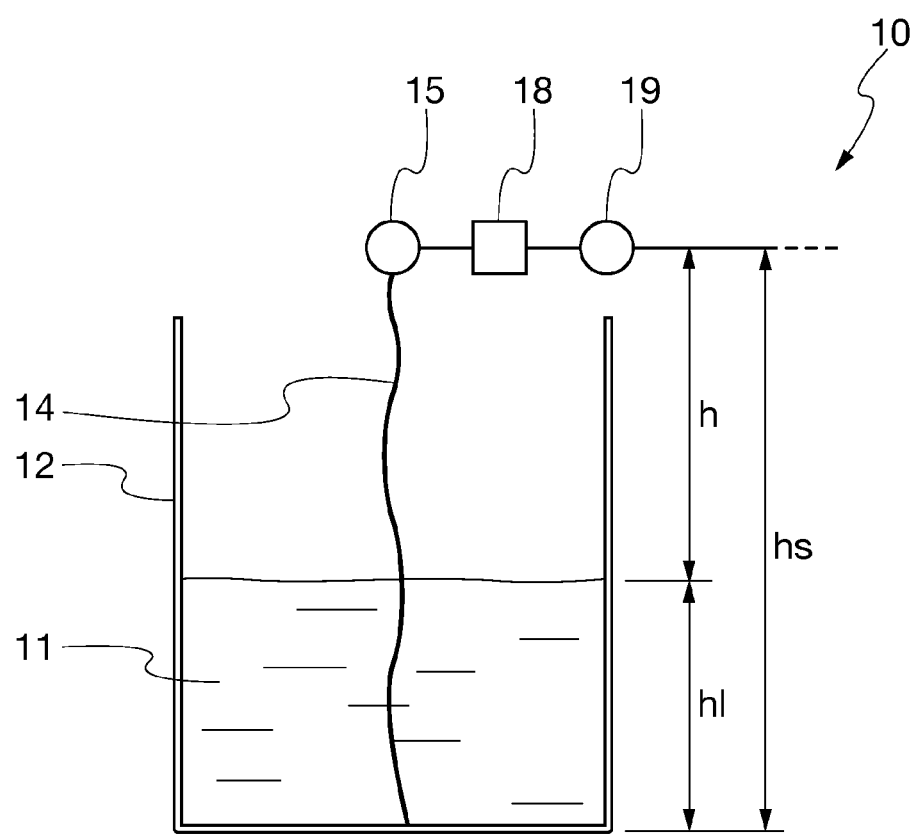
FIG. 1 shows a schematic representation of a sensor for determining high of a liquid in a container based on the hydrostatic pressure principle applied according to present invention.
Figure 2:
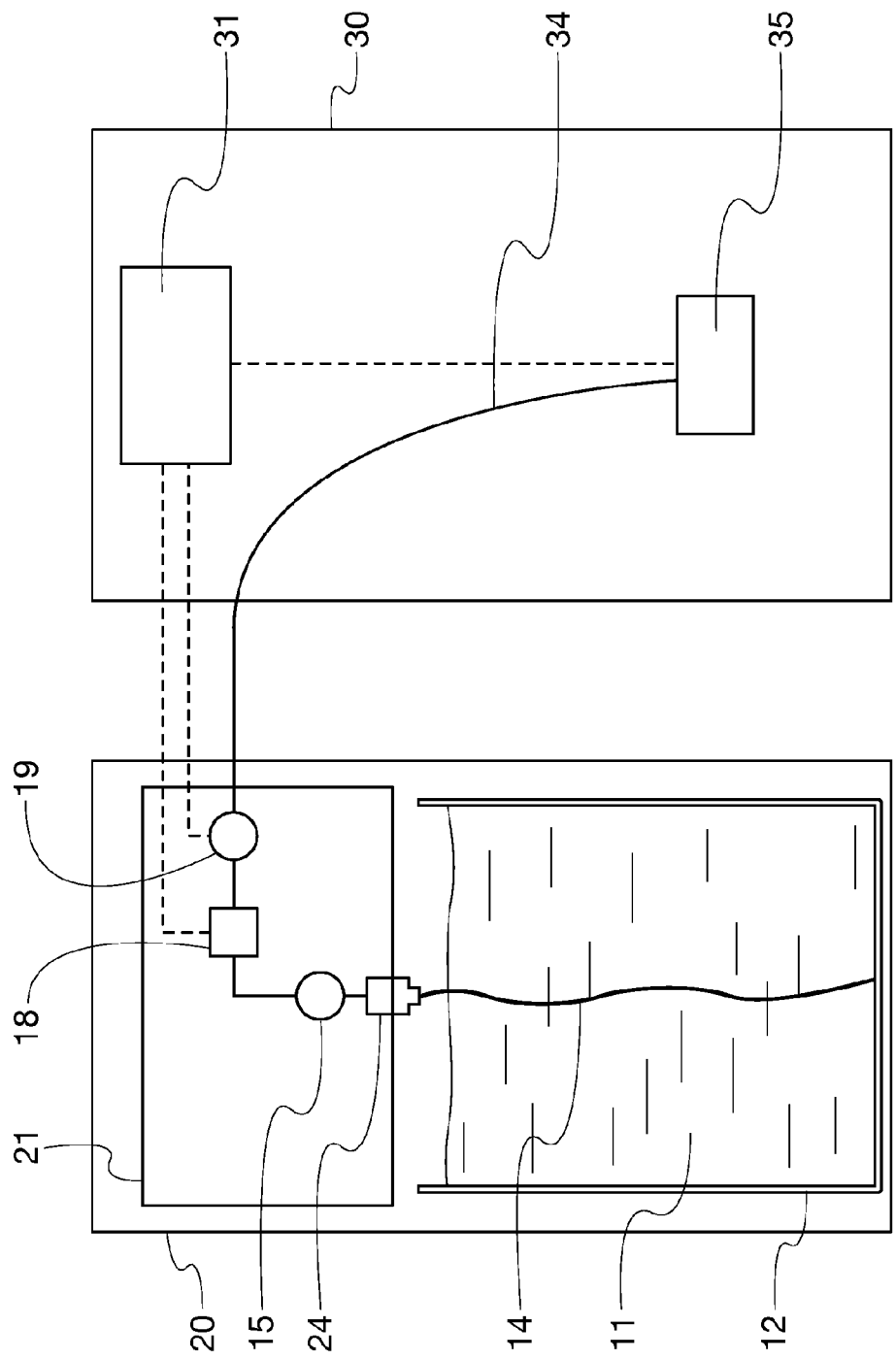
FIG. 2 shows a device for measuring milk level in a container applied to a coffee machine.

With reference to FIG. 1 the basic principle used by a device 10 for measuring a level of a liquid 11 in a suction pipe or tube 14 immersed in a container 12 including the liquid is, according to present invention, as follows.
The device 10 comprises a pressure sensor 15, a valve 18, for instance an electro-valve or a non-return valve, and a pump 19.
According to the preferred embodiment the sensor, the valve and the pump are located next to each other starting from the tube 14 immersed in the liquid of the container 12.
According to further embodiments, the position along the tube of the valve is inverted with the position of the pump so that the sensor, the pump and the valve are located next to each other starting from the tube 14, without departing from the scope of the invention as disclosed and claimed. Preferably, according to both configurations the tube 14 is arranged to reach the bottom of the container.
More preferably, the tube is a flexible tube made of food compatible material.
According to present example, the height of the sensor from the bottom of the container is known and the range of pressures measured by the sensor is between −50 mBar and +50 mBar, whereby it is considered that in the above range, that is considered a limited range, the sensor has a linear reply.
When the tube 14, due to the action of the pump 19, is filled with the liquid 11 up to the valve 18 that impedes back flow of the liquid, the sensor 15, being in contact with the liquid, measures a negative pressure because the liquid in the tube pulls towards the bottom of the container 12.
According to the hydrostatic pressure principle the pressure that the sensor 15 measures can be converted into a height that is proportional to the distance between the sensor 15 and the liquid surface in the container 12. Then by knowing the height of the sensor (hs) in respect to the bottom of the container the height of the liquid (hl) can be determined as well as the quantity of liquid, if the container shape and capacity are known.

The expression which represents the hydrostatic pressure is, as known, the following one:

$$P=h*G*D$$

Wherein

P is the hydrostatic pressure inside the tube 14;

h is the height equivalent to the hydrostatic pressure corresponding to the distance between the sensor 15 and the liquid surface in the container 12;

G is the gravity acceleration that is a constant value in a certain location;

D is the density of the liquid that is a constant value for a certain liquid.

Since the tube 14 after any suction is filled with the liquid thanks to the valve 18, the sensor system is able to determine the milk height at any point in time, except during an extraction step wherein the pressure values are typically unstable.

According to the preferred embodiment of present invention the device 10 is a milk level measurement device for a coffee machine 30.

Obviously, according to further embodiments, the device 10 could be a measurement device for any kind of liquids usable in a coffee machine without departing from the scope of the invention as disclosed and claimed.

The device 10 is, for instance, included into a fridge 20 having a bottom surface wherein the container is located and is controlled by a control unit 31, for instance the same control unit arranged to control the coffee machine 30.

In particular, the control unit 31 is arranged to control operation of the main components of the device, as for instance, the sensor 15, the valve 18, for instance an electro-valve, and the pump 19, as will be explained later on in detail.

In particular, according to the preferred embodiment of present invention, the control unit 31 is arranged to activate the pump 19 and open the electro-valve when a milk delivery is required and to deactivate the pump and close the electro-valve at the end of the milk delivery.

According to further embodiments the electro-valve can be replaced by a non return valve without departing from the scope of the invention as disclosed and claimed.

According to the preferred embodiment the device 10, in particular the sensor 15, is included into a box 21 on a upper part the fridge 20, so that, being known the distance of the sensor from the bottom of the fridge, i.e. substantially from the bottom of the container, any pressure measured, after the insertion of a new container 12, actuation of the pump 19 and locking of the valve 18, is such to correspond to the height of milk in the new container, thanks to the above mentioned hydrostatic principle application.

Preferably, the device 10 comprises an adapter 24 arranged for granting a removable connection of the tube 14 to the device 10, for instance for cleaning or other operations.

The pump 19, preferably, is connected at his outtake to the coffee machine 30, through a further tube 34.

In particular, the further tube 34 is connected, for instance, to a foaming device 35 arranged for heating and/or foaming milk.

Thanks to the use of a liquid having constant characteristics, such as milk, and to the use of the device in a certain location, the application of the hydrostatic pressure principle can give reliable and stable results.

According to the preferred embodiment the control unit or processor 31, on the basis of procedures developed in the design phase of the device, is configured to:

calculate the milk level in the container 12 on the basis of the sensor signals; in particular after each delivery the control unit 31 provides to manage the signals coming from the sensor 15 by storing them and calculating, on the basis of the hydrostatic pressure, the level of the milk into the container;

calculate the quantity of milk in the container on the basis of the calculated level and of the size of the container; in particular, preferably, the control unit 31 comprises stored therein a table including, for instance, size and capacity of a plurality of containers and, when a new container is inserted into the fridge, the control unit requires that the user, by means of a user interface of known type, teaches to the control unit the size of the new container provided in the table;

control the distribution of milk on the basis of the quantity of milk remaining into the container; in particular, preferably, the control unit 31 locks the distribution of a certain beverage with milk, when the quantity of milk into the container, after a previous delivery, is calculated as insufficient for a new delivery of a certain beverage with milk; more preferably the control unit, after a previous delivery of a beverage with milk, inform the user by means of a warning on an information device, for instance a display of the coffee machine, about the type of beverage with milk that can be delivered on the basis of the remaining milk quantity. Moreover, according to the preferred embodiment the control unit or processor 31, is configured to:

compensate variations of the sensor signals due to change on parameters like ambient temperature, liquid type, etc.;

calibrate the device following, for instance, change on fridge or containers characteristics.

The operation of the device as described above is the following.

According to the hydrostatic pressure principle the sensor 15, located at a predetermined height, delivers, after a first insertion of a new container, a first extraction of milk, a stop of the pump and a closure of the valve, a pressure value below 0 mBar as a result of the hydrostatic pressure; such a pressure is measured by the sensor 15 in the milk tube 14.

When the pump 19 starts to work, the pressure signal at the sensor 15 goes down as the pump sucks the milk, the control unit 31 stops to measure the pressure signal, due disorders in the pressure signal caused by the pump 19.

As soon as the pump 19 stops to work, the pressure signal at the sensor 15 is considered valid again and is detected and calculated by means of the control unit 31, for instance the same control unit installed into the coffee machine 30.

According to one of the features of present invention it is provided that the control processor 31 comprises procedures arranged to lock delivery of some products with milk when the measured level of milk is insufficient.

In particular, as different products need a different amount of milk, the control processor will block only products requiring a quantity of milk that is higher than that measured in the container.

Advantageously by controlling after each milk delivery, the level of the milk it is possible to clearly define set points, which allow to block/enable products.

Preferably, several set points can be realized to set a warning before to block products.

The connection of the milk pipe 14 from the adapter 24 to the bottle/container in the fridge can be done as an easy plug connection, without any contact for a level measurement device 10.

The device 10 does not require that electric signal be handled by the adapter 24.

As apparent to a skilled person all the components along the suction line, as for instance the tube 14, the adapter 24, the sensor 15, the valve 18 and the pump 19 must have a food surface for hygienic reasons.

In summary the device according to present invention furnishes the following advantages:
- the milk height can be measures for any bottle/container independent of their form, because no mechanical device is provided for measuring the milk level;
- the sensor can be placed anywhere in the sucking line before the valve and the pump;
- several set-points can be realized for different warning/blocking in relation with the delivery of certain products including milk;
- the level sensor can be positioned independent of any type of shape or opening in the milk container.

Of course, without prejudice to the basic principles of the invention, the details and embodiments may vary, also significantly, with respect to what has been described herein by way of example only, without departing from the scope of the invention as defined by the claims that follow.

The invention claimed is:

1. A device for measuring a level of milk in a container, comprising: a tube having an end immersed in the container and arranged to reach a predetermined position with respect to a bottom of the container; a sensor provided along the tube and arranged to sense a pressure of the milk in the tube, the sensor being positioned at a predetermined height from the bottom of the container and being in contact with the milk, measures a pressure; a pump provided along the tube, in a position farther than the sensor from the end of the tube immersed in the container, and arranged to pump the milk from the container through the tube; a valve located along the tube, in a position farther than the sensor from the end of the tube immersed in the container, and arranged to impede back flow of the milk into the container through the sensor when the pump stops pumping the milk, whereby the sensor, being in contact with the milk, is arranged to measure a hydrostatic pressure of the milk after each stop of the pump; and a control unit configured to measure the level of the milk in the container on the basis of the hydrostatic pressure of the milk in the tube as measured by the sensor after each stop of the pump to determine the type of beverage that can be delivered on the basis of the quantity of milk remaining in the container.

2. The device according to claim 1 wherein said valve is a non-return valve.

3. The device according to claim 2 further comprising an adapter arranged for providing a removable connection of the tube to the device.

4. The device according to claim 2 wherein the pump is located along the tube in a position farther than the valve from the end of the tube immersed in the container.

5. The device according to claim 1, wherein the control unit is further configured to control activation/deactivation of the pump and opening/closing of the valve, respectively.

6. The device according to claim 5 wherein said control unit comprises stored therein a table including size and capacity of a plurality of containers and is arranged to calculate a quantity of milk remaining into the container on the basis of the measured level of the milk and of the size and capacity of the container.

7. The device according to claim 6 wherein said control unit is associated with an information device arranged to inform a user about the type of beverage that can be delivered on the basis of the quantity of milk remaining into the container.

8. The device according to claim 5 further comprising an adapter arranged for providing a removable connection of the tube to the device.

9. The device according to claim 5 wherein the pump is located along the tube in a position farther than the valve from the end of the tube immersed in the container.

10. The device according to claim 1 further comprising an adapter arranged for providing a removable connection of the tube to the device.

11. The device according to claim 1 wherein the pump is located along the tube in a position farther than the valve from the end of the tube immersed in the container.

12. A coffee machine for the delivery of coffee, hot beverages, frothed beverages and hot and frothed beverages including a device as claimed in claim 1.

13. The device according to claim 1, wherein the valve is located along the tube, in a position between the sensor and the pump.

14. A method for measuring a level of milk in a container using a pressure sensor provided along a tube, the tube having an end immersed in the container and arranged to reach a predetermined position with respect to a bottom of the container, the pressure sensor positioned at a predetermined height from the bottom of the container, said method comprising the steps of: pumping a certain quantity of the milk from the container through the tube; stopping pumping of the milk through the tube and closing a valve provided along the tube, the valve located at a position farther than the sensor from the end of the tube immersed in the container and arranged to lock back flow of the milk into the container through said sensor and said tube; measuring a hydrostatic pressure of the milk by the sensor while the sensor is in contact with the milk, after each stop of the pump: and measuring the level of the milk in the container on the basis of the hydrostatic pressure of the milk in the tube as measured by the sensor after each stop of the pump to determine the type of beverage that can be delivered on the basis of the quantity of milk remaining in the container.

15. The method according to claim 14 comprising the further steps of storing in a control unit a table including size and capacity of a plurality of containers; and calculating using the control unit a quantity of milk remaining in the container on the basis of the measured level of the milk and of the size and capacity of the container stored into the table.

16. The method according to claim 15 comprising the further step of informing a user whether a beverage can be delivered on the basis of the calculated quantity of milk remaining in the container.

* * * * *